(12) United States Patent
Herdrich et al.

(10) Patent No.: US 8,775,834 B2
(45) Date of Patent: ***Jul. 8, 2014

(54) METHODS AND APPARATUSES FOR CONTROLLING THREAD CONTENTION

(71) Applicant: Intel Corporation, Santa Clara, CA (US)

(72) Inventors: Andrew Herdrich, Hillsboro, OR (US); Ramesh Illikkal, Folsom, CA (US); Donald Newell, Portland, OR (US); Ravishankar Iyer, Portland, OR (US); Vineet Chadha, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/791,089

(22) Filed: Mar. 8, 2013

(65) Prior Publication Data

US 2013/0191666 A1 Jul. 25, 2013

Related U.S. Application Data

(63) Continuation of application No. 13/721,794, filed on Dec. 20, 2012, which is a continuation of application No. 13/461,956, filed on May 2, 2012, which is a continuation of application No. 12/414,504, filed on Mar. 30, 2009, now Pat. No. 8,190,930.

(51) Int. Cl.
| | |
|---|---|
| *G06F 1/00* | (2006.01) |
| *G06F 1/26* | (2006.01) |
| *G06F 1/32* | (2006.01) |
| *G06F 9/46* | (2006.01) |
| *G06F 9/50* | (2006.01) |

(52) U.S. Cl.
CPC ............ *G06F 1/3206* (2013.01); *G06F 1/3203* (2013.01); *G06F 1/32* (2013.01); *G06F 1/3234* (2013.01); *G06F 1/324* (2013.01); *G06F 1/3296* (2013.01); *G06F 9/50* (2013.01); *G06F 9/5094* (2013.01)
USPC ............ 713/300; 713/320; 713/322; 718/100

(58) Field of Classification Search
CPC ....... G06F 1/32; G06F 1/3203; G06F 1/3206; G06F 1/3234; G06F 1/324; G06F 1/3296; G06F 9/50; G06F 9/5094
USPC .......................... 713/300, 320, 322; 718/100
See application file for complete search history.

(56) References Cited

U.S. PATENT DOCUMENTS

| | | | |
|---|---|---|---|
| 7,111,179 B1 | 9/2006 | Girson et al. | |
| 7,210,048 B2 | 4/2007 | Bodas | |

(Continued)

OTHER PUBLICATIONS

U.S. Patent and Trademark Office, Office Action mailed Apr. 17, 2013, with Reply filed Jul. 10, 2013, and Supplemental Reply filed Aug. 6, 2013, in U.S. Appl. No. 13/721,794.

(Continued)

*Primary Examiner* — Ji H Bae
(74) *Attorney, Agent, or Firm* — Trop, Pruner & Hu, P.C.

(57) ABSTRACT

An apparatus comprises a plurality of cores and a controller coupled to the cores. The controller is to lower an operating point of a first core if a first number based on processor clock cycles per instruction (CPI) associated with a second core is higher than a first threshold. The controller is operable to increase the operating point of the first core if the first number is lower than a second threshold.

20 Claims, 6 Drawing Sheets

(56) References Cited

U.S. PATENT DOCUMENTS

| | | |
|---|---|---|
| 7,457,931 B1 | 11/2008 | Fedorova |
| 7,689,851 B2 | 3/2010 | Sawyers et al. |
| 7,818,592 B2 | 10/2010 | Meier et al. |
| 8,219,993 B2 | 7/2012 | Johnson et al. |
| 2007/0186024 A1 | 8/2007 | Aberg |
| 2007/0186121 A1 | 8/2007 | Yasuo |
| 2008/0040554 A1 | 2/2008 | Zhao et al. |
| 2008/0059817 A1 | 3/2008 | Kuwahara |
| 2008/0075101 A1 | 3/2008 | Illikkal et al. |
| 2008/0250415 A1 | 10/2008 | Illikkal et al. |
| 2009/0150893 A1 | 6/2009 | Johnson et al. |
| 2009/0259800 A1 | 10/2009 | Kilzer et al. |
| 2010/0218029 A1 | 8/2010 | Floyd et al. |

OTHER PUBLICATIONS

U.S. Patent and Trademark Office, Final Office Action mailed Sep. 23, 2013, in U.S. Appl. No. 13/721,794.

U.S. Patent and Trademark Office, Office Action mailed Jun. 3, 2013, with Reply filed Aug. 27, 2013, in U.S. Appl. No. 13/461,956.

U.S. Patent and Trademark Office, Final Office Action mailed Feb. 6, 2013, with Request for Continued Examination filed May 6, 2013, in U.S. Appl. No. 13/461,956.

U.S. Patent and Trademark Office, Office Action mailed Aug. 8, 2012, with Reply filed Nov. 7, 2012, in U.S. Appl. No. 13/461,956.

METHODS AND APPARATUSES FOR CONTROLLING THREAD CONTENTION

This application is a continuation of U.S. patent application Ser. No. 13/721,794, filed Dec. 20, 2012, with is a continuation of U.S. patent application Ser. No. 13/461,956, filed May 2, 2012, which is a continuation of U.S. patent application Ser. No. 12/414,504, filed Mar. 30, 2009, now U.S. Pat. No. 8,190,930, issued May 29, 2012, the content of which is hereby incorporated by reference.

FIELD OF THE INVENTION

Embodiments of the invention relate to the field of computer systems; more particularly, to controlling thread contention in a computer system.

BACKGROUND OF THE INVENTION

Advances in semiconductor processing and logic design have permitted an increase in the amount of logic on integrated circuit devices. As a result, computer system configurations have evolved from a single or multiple integrated circuits in a system to multiple cores and multiple logical processors present on individual integrated circuits. A processor or integrated circuit typically comprises a single processor die that has any number of processing resources, such as cores, threads, or logical processors.

In a processor with multiple threads, the behavior of one thread potentially affects the behavior of another thread executing thereon because of sharing of resources, such as, for example, caches, memory, and power.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

Figure 1:
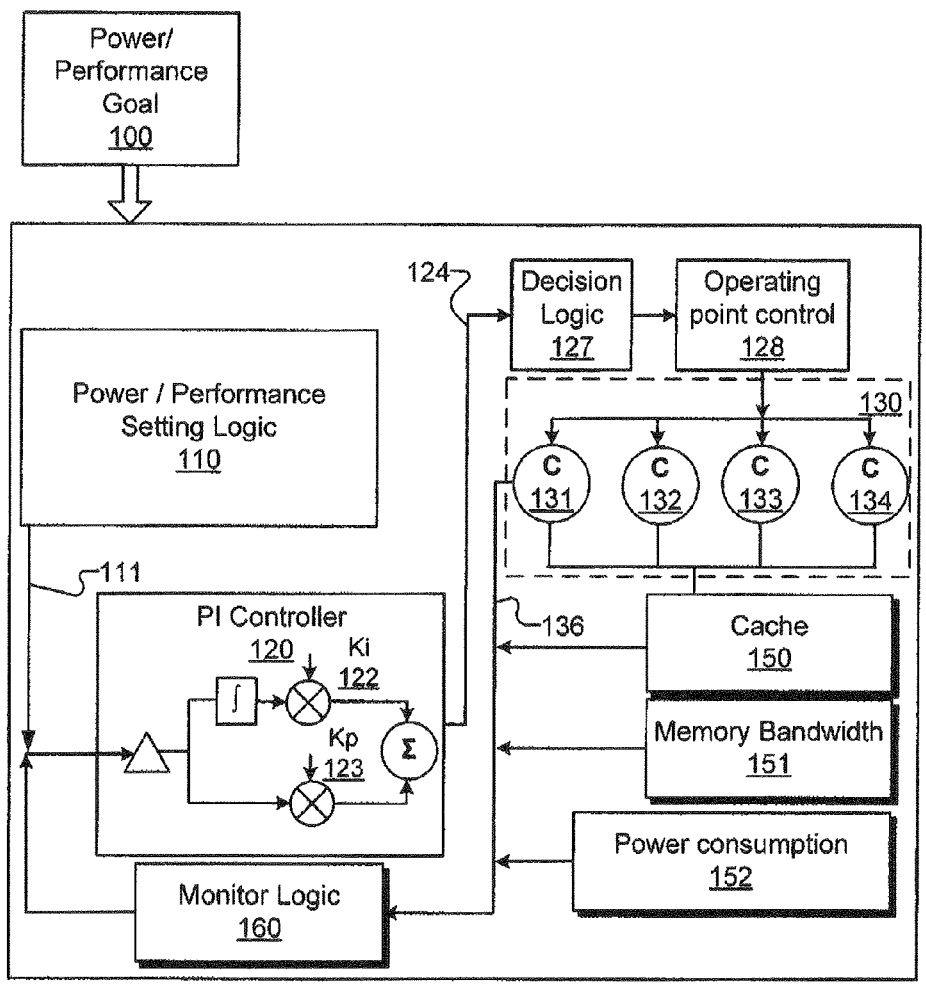
FIG. 1 shows an embodiment of a computer system including an apparatus to control resource contention to shared resources, based on performance feedback.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

In other instances, well-known components or methods, such as, for example, microprocessor architecture, virtual machine monitor, power control, clock gating, and operational details of known logic, have not been described in detail in order to avoid unnecessarily obscuring the present invention.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The method and apparatus described herein are for controlling resource contention by regulating clock throttling and power. Specifically, regulating clock throttling and power is discussed in reference to multi-core processor computer systems. However, the methods and apparatus for controlling resource contention are not so limited, as they may be implemented on or in association with any integrated circuit device or system, such as cell phones, personal digital assistants, embedded controllers, mobile platforms, desktop platforms, and server platforms, as well as in conjunction with any type of processing element, such as a core, a hardware thread, a software thread, or a logical processor, an accelerator core or other processing resource. In addition, controlling resource contention may take place in any hardware/software environment, such as an operating system or a hypervisor executing on hardware.

Overview

Embodiments of a method and apparatus for controlling resource contention to shared resources by regulating clock throttling and power of a processor are described. In one embodiment, the processor is a multi-core processor comprising two or more cores. In one embodiment, a controller regulates the cores to increase performance of a hardware thread in conjunction with a feedback mechanism including a proportional-integral-derivative controller (PID controller).

FIG. 1 shows an embodiment of a computer system including an apparatus to control resource contention to shared resources. Many related components such as buses and peripherals have not been shown to avoid obscuring the invention. Referring to FIG. 1, the computer system includes power/performance setting logic 110, proportional-integral controller (PI controller) 120, monitor logic 160, decision logic 127, operating point control logic 128, processor 130, cache 150, and memory (not shown). In one embodiment, PI controller 120, decision logic 127, operating point control 128, cache 150, or any combination thereof is integrated in processor 130.

In one embodiment, a computer system includes input/output (I/O) buffers to transmit and receive signals via interconnect (e.g., 111, 124, 136). Examples of the interconnect include a Gunning Transceiver Logic (GTL) bus, a GTL+ bus, a double data rate (DDR) bus, a pumped bus, a differential bus, a cache coherent bus, a point-to-point bus, a multi-drop bus or other known interconnect implementing any known bus protocol.

In one embodiment, processor 130 includes multiple processing elements, such as processing elements 131-134. A processing element comprises a thread, a process, a context, a logical processor, a hardware thread, a core, an accelerator core or any processing element, which shares access to other shared resources of processor 130, such as, for example, reservation units, execution units, higher level caches, memory, etc. In one embodiment, a processing element is a thread unit, i.e. an element which is capable of having instructions independently scheduled for execution by a software thread. In one embodiment, a physical processor is an integrated circuit, which includes any number of other processing elements, such as cores or hardware threads.

In one embodiment, a core is logic located on an integrated circuit capable of maintaining an independent architectural state with respect to another core. Each independently maintained architectural state is associated with at least some dedicated execution resources. In one embodiment, a hardware thread is logic located on an integrated circuit capable of maintaining an independent architectural state with respect to another hardware thread. Each independently maintained hardware thread shares access to execution resources. In some embodiments, a core and a hardware thread are used interchangeably. In one embodiment, a core or a hardware thread is also referred to as a processing element.

In one embodiment, a hardware thread, a core, or a processing element is viewed by an operating system or management software as an individual logical processor. Software programs are able to individually schedule operations on each logical processor. Additionally, in some embodiments, each core includes multiple hardware threads for executing multiple software threads.

In one embodiment, a hypervisor (not shown) provides an interface between software (e.g., virtual machines) and hardware resource (e.g., processor 130). In one embodiment, a hypervisor abstracts hardware so that multiple virtual machines run independently in parallel. In one embodiment, a virtual machine provides a software execution environment for a program, such as, for example, a task, a user-level application, guest software, an operating system, another virtual machine, a virtual machine monitor, other executable code, or any combination thereof. In one embodiment, a hypervisor allocates hardware resources (e.g., a core, a hardware thread, a processing element) to different programs.

In one embodiment, power/performance goal 100 is a user configurable setting. In other embodiment, power/performance goal 100 is determined based on a power saving profile, a user setting, an operating system, a system application, a user application, or the like. In one embodiment, power/performance setting logic 110 receives information from power/performance goal 100.

In one embodiment, power/performance setting logic 110 stores target values of power consumption of processor 130 or a system in which processor 130 is located. In one embodiment, the computer system is referred to herein as a platform.

In one embodiment, power/performance setting logic 110 stores a target value of cycles per instruction (CPI) associated with a program executing on a processing element. In one embodiment, the program is a high priority program. The CPI value is used as a set point for PI controller 120. In one embodiment, information about misses per instruction (MPI), cache line fills, cache line evictions, etc. is used in conjunction with CPI. It will be appreciated by those of ordinary skill that other metrics may be used as performance data with respect to a processing element.

In one embodiment, the computer system includes a number of shared resources for which the hardware threads contend. In one embodiment, the shared resources include cache, a translation lookaside buffer (TLB), memory, and power. In one embodiment, a computer system is required to run under specific power constraints.

In one embodiment, low priority programs are of lesser importance to an end-user. In another embodiment, a low priority program is a program that is not able to fully benefit from the maximum core CPU potential performance because the program involves a lot of memory requests, or intensive I/O requests which causes long waiting time.

In one embodiment, a low priority program competes for a same set of shared resources with a high priority program in a multi-core processor system. In one embodiment, behavior of one core (executing a low priority program) creates unfairness in the usage of shared resources and pipelines. As a result, an unpredictable variability in performance from the unbalanced usage of shared resources occurs. In one embodiment, it will be beneficial to control shared resource contention by regulating a core associated with a low priority program, such as, for example, reducing a power state of the core, reducing a clock frequency by clock throttling, or both. For example, a background application, such as virus scan, executes on a first core utilizing enough shared resources to adversely affect the performance of a second core, which is executing a foreground application (a high priority program).

In one embodiment, monitor logic 160 receives or determines data, such as, for example, cache occupancy, cache line fills, cache line evictions, memory bandwidth 151, power consumption 152, memory capacity, and input/output requests, which are associated with usage of various shared resources. In one embodiment, the data are associated with an application, a software thread, a hardware thread, a platform, or combinations thereof. In one embodiment, monitor logic 160 also receive CPI information of each core (e.g., cores 131-134) via interface 136.

In one embodiment, PI controller 120 is coupled to power/performance setting logic 110 via 111 to receive a set point (e.g., power consumption target, CPI target value). In one embodiment, the set point is for a CPI value of a core associated with a high priority application. In one embodiment, the set point is for a power consumption value of processor 130.

In one embodiment, PI controller 120 also receives feedback data (e.g., CPI of each core from monitor logic 160, power consumption value from monitor logic 160). In other embodiment, such information is received from processor 130 and a power regulator directly. In one embodiment, monitor logic 160 is a part of a processor performance monitoring components, an integrated part of platform components, or both. Controlling resource contention in conjunction with PI controller 120 will be described in further detail below with additional references to the remaining figures.

In one embodiment, PI controller 120 is configured by changing parameters such as, an integral gain (Ki) 122 and a proportional gain (Kp) 123. In one embodiment, PI controller 120 further comprises a derivative gain (Kd). In one embodiment, Kp is set to 2.0, Ki is set to 0.3, and Kd is set to 0. In one embodiment, PI controller 120 is used to reduce an overshoot and ringing effect, such that the regulating mechanism does not react too quickly to feedback of performance data. In other words, PI controller 120 provides a smoother output response than simple rule-based determination. In one embodiment, parameters (e.g., Kp, Ki, and Kd) are adjusted to improve the response of output from controller 120. It will be appreciated by those skilled in the art that these parameters may be scaled up or down to adjust a degree of aggressiveness of a control mechanism.

In one embodiment, decision logic 127 is coupled to receive an output from PI controller 120 via interconnect 124. Decision logic 127 determines whether to increase, to decrease, or to maintain the enforcement of power/clock throttling based on the output from PI controller 120 and some threshold values. In one embodiment, increasing or decreasing enforcement is performed by regulating power of processor 130, by regulating clock throttling of the cores (e.g., cores 131-134), or both. Operations of enforcement will be described in further detail below with respect to operating point control 128.

In one embodiment, the threshold values are associated with settings in power/performance setting logic 110 (e.g., user configurable, preset by systems, etc.). In one embodiment, no action is required if the output from PI controller 120 is within a range (a lower bound and an upper bound, e.g., −0.5% and 0.5% respectively). Determination based on the settings of threshold values will be described in further detail below with additional references to the remaining figures (e.g., FIG. 3).

In one embodiment, a computer system, and in particular, processor 130 supports different operating points (e.g., performance states (P-states) and clock throttling states (T-states)), in accordance with Advanced Configuration and Power Interface (ACPI) specification (see, Advanced Configuration and Power Interface Specification, revision 3.0b, Oct. 10, 2006). In one embodiment, C0 working state of a processor is divided into P-states (performance states) in which clock rate is reduced and T-states (throttling states) in which clock rate is throttled by inserting STPCLK (stop clock) signals and thus omitting duty cycles. In one embodiment, a P-state and a T-state of processor 130 are set by changing values of one or more model specific registers (MSRs).

In one embodiment, processor 130 support various P-States, P0 through Pn, P0 being the highest state and Pn being the lowest state. At a P0 state, processor 130 runs at a highest frequency. At a Pn state, processor 130 runs at a lower frequency corresponding to a greater value of n. In one embodiment, processor 130 is capable of operating at six different performance states (P0-P5). For example, from P0 through P5, processor 130 operates at 100%, 90%, 85%, 75%, 65%, and 50% of full performance respectively. In one embodiment, switching to the various P-states is also referred to as dynamic voltage and frequency scaling (DVFS).

In one embodiment, increasing a P-state is performed by transitioning the P-state from a lower state to a higher state (e.g., P1 to P0), where processor 130 will operate at a higher frequency (thus consuming power at a higher rate) following the change. In one embodiment, these performance states are only valid when processor 130 is in a power state C0.

In one embodiment, processor 130 supports various T-States, T0 through Tn, T0 being the highest state and Tn being the lowest state. In one embodiment, when operating at a T-state, processor 130 is forced to be in an idle state (stop performing an operation) a percentage of the duty cycles. At a T0 state, processor 130 runs at a 100% of duty cycles. At a Tn state, processor 130 runs at a lower percentage of duty cycles corresponding to a greater value of n. In one embodiment, processor 130 is capable of operating at six clock throttling states (T0-T5). For example, from T0 through T5, processor 130 operates at 100%, 90%, 80%, 70%, 60%, and 50% of all duty cycles respectively. In one embodiment, switching to different T-states is also referred to as clock modulation, frequency modulation, clock-gating, etc.

In one embodiment, increasing a T-state is performed by transitioning the T-state of a core (e.g., cores 131-134) from a lower state to a higher state (e.g., T1 to T0), where the core will operate at a higher percentage of duty cycles following the change. In one embodiment, these clock throttling states are only valid when processor 130 is in a power state C0.

In one embodiment, a combination of a P-state and a T-state of processor 130 is referred to herein as an operating point. In one embodiment, operating point control 128 controls and manages a P-state, a T-state, or both. In one embodiment, operating point control 128 stores a current P-state, a current T-state, or both. In one embodiment, operating point control 128 sets a next operating point (changing a P-state, a T-state, or both) based on current states and the output from decision logic 127. In one embodiment, operating point control 128 decreases an operating point (lower to a different operating point) by decreasing a T-state, decreasing a P-state, or both. In one embodiment, operating point control 128 increases an operating point by increasing a T-state, increasing a P-state, or both.

In one embodiment, operating point control 128 regulates power and clock throttling of processor 130. In one embodiment, operating point control 128 receives output from decision logic 127 on whether more enforcement is required or otherwise. In one embodiment, decision logic 127 in integrated with operating point control 128.

In one embodiment, if the output from decision logic 127 indicates more enforcement is required, operating point control 128 decreases the T-state, as long as the T-state is not at the lowest state (e.g. T5). Otherwise, operating point control 128 decreases the P-state. In one embodiment, operating point control 128 is programmed to use only certain T-states (e.g., T0-T2) instead of all T-states available.

In one embodiment, if the output from decision logic 127 indicates that less enforcement is required, operating point control 128 increases the P-state if the P-state is at a highest state (e.g. P5). Otherwise, operating point control 128 increases T-state. In one embodiment, operating point control 128 is programmed to use only certain T-states (e.g., T0-T2) instead of all T-states available.

In one embodiment, operating point control 128 sets an operating point (a combination of P-state and T-state) based on determination from decision logic 127. In one embodiment, decision logic 127 further operates in conjunction with information including misses per instruction, a number of cache line fills, and a number of cache line evictions to avoid overcorrecting by PID controller 120. For example, if performance does not improve after reducing a P-state (for example, a cache-streaming application is the root cause of resource contention), operating point control 128 performs further enforcement by reducing T-state instead. In one embodiment, in order to manage overall power consumption, operating point control 128 performs P-state enforcement because more power saving is yielded by reducing a P-state than reducing a T-state. The operations will be described in further detail below with additional references to the remaining figures.

In one embodiment, a computer system further includes memory (not shown) to store associations of a program and a corresponding core on which the program executing. In one embodiment, the memory further stores a quality of service requirement (QoS), priority information, etc. associated with each program. Operating point control 128 performs enforcement on the proper cores based in part on contents of the memory.

In one embodiment, computer system registers (not shown), accessible by an operating system, are used for configuring operating point control 128, decision logic 127, monitor logic 160, and PI controller 120. In one embodiment, PI controller 120, monitor logic 160, decision logic 127, and operating point control 128 operate independently of an operating system. In one embodiment, monitor logic 160 and decision logic 127 operate in conjunction with an operating system to regulate power and clock throttling of the cores (e.g., cores 131-134).

In one embodiment, an operating system schedules time (time-slicing) to different applications based on their priorities. A low priority program is allocated with a shorter time-slice than a high priority program. In one embodiment, such time-slicing is not effective in controlling resource contention if a high priority is running in parallel with other low priority programs in a system (with multiple processing elements). In one embodiment, the performance degradation caused by resource contention is mitigated by regulating the cores associated with low priority programs.

Figure 2:
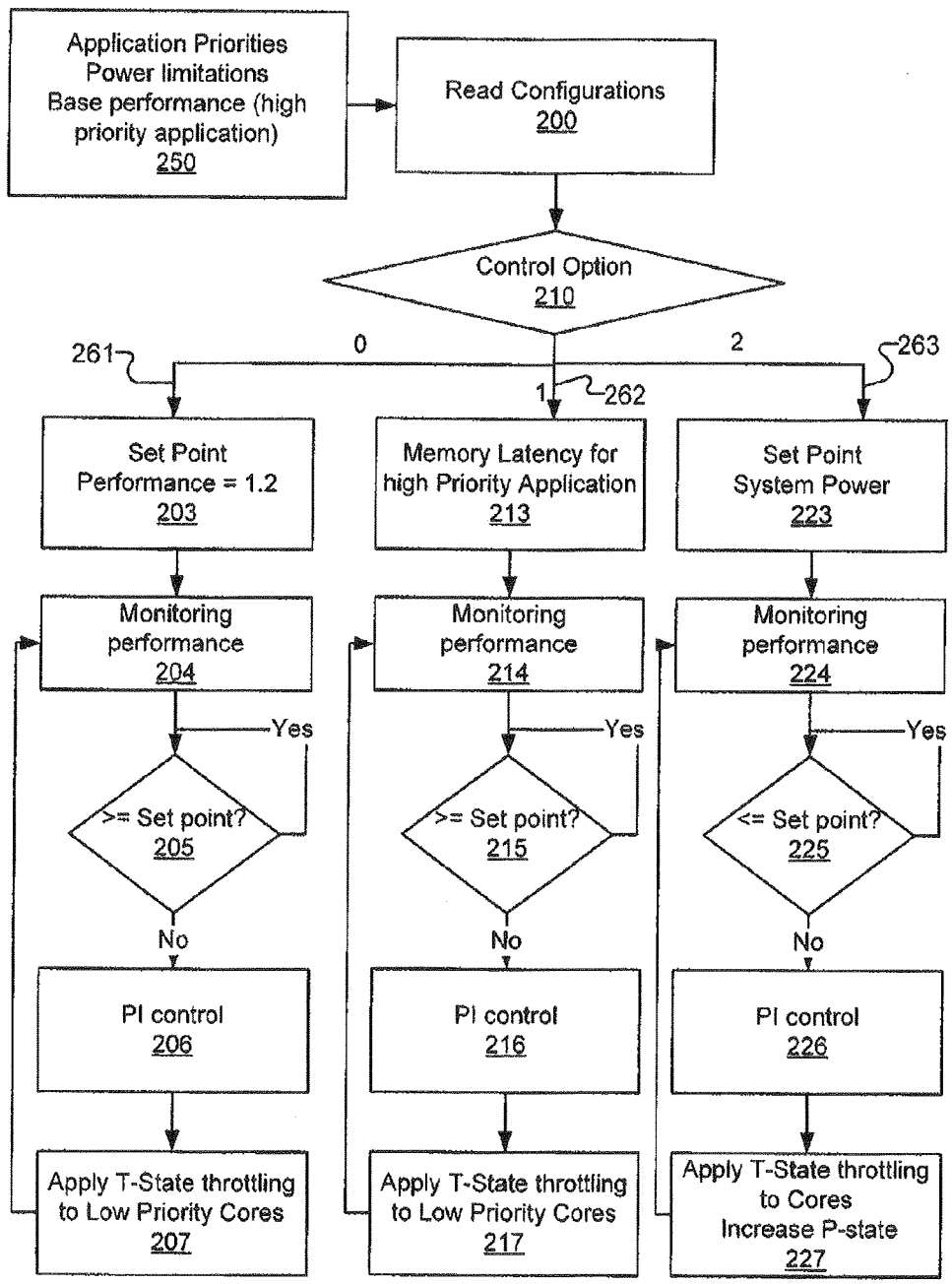
FIG. 2 is a flow diagram of one embodiment of a process to control resource contention to shared resources, based on performance feedback.

FIG. 2 is a flow diagram of one embodiment of a process to control resource contention to shared resources. The process is performed by processing logic that may comprise hardware (circuitry, dedicated logic, etc.), software (such as is run on a general purpose computer system or a dedicated machine), or a combination of both. In one embodiment, the process is performed in conjunction with a PI controller (e.g., PI controller 120 with respect to FIG. 1). In one embodiment, the process is performed by a computer system with respect to FIG. 5.

Referring to FIG. 2, the process begins by processing logic reading configurations, such as, for example, performance goal in terms of CPI (processing block 200). In one embodiment, processing logic also receive information including priorities of applications, power constraints, performance targets, etc. (process block 250).

In one embodiment, processing logic determines a control option (process block 210). In one embodiment, the control option includes at least one of control mode 0 (indicated as 261), control mode 1 (indicated as 262), control mode 2 (indicated as 263), or any combinations thereof.

In one embodiment, processing logic slows down a low priority program to increase performance of a high priority program when operating in control mode 0. In one embodiment, processing logic slows down one or more programs which are of lower priorities with respect to another group of programs, when operating in control mode 0.

In one embodiment, processing logic sets a set point of a PI controller (process block 203). In one embodiment, the set point is a target for performance (e.g., 1.2×). In one embodiment, the value is 1.0× when a program is executing at full performance (e.g., executing alone on the platform without resource contention). In one embodiment, the value is set to 1.2× to indicate that 20% slow down from the full performance is acceptable. In one embodiment, a performance target is based on workload performance metrics, such as, for example, transactions per minute, operations per second, etc.

In one embodiment, processing logic monitors CPI of a core executing a high priority program (process block 204).

In one embodiment, processing logic also monitors information, such as, for example, misses per instruction (MPI), cache line fills, cache line evictions, etc.

In one embodiment, processing logic compares data from the monitoring with the set point (process block 205). In one embodiment, no action is taken if the performance data are within a predetermined range. In one embodiment, if the performance data are higher than the set point, a PI control mechanism generates an output based at least on the difference (error) between the set point and performance data (process block 206). In one embodiment, processing logic determines, based on the output, whether to increase a T-state (less enforcement) or to decrease a T-state (more enforcement) of cores associated with low priority programs (process block 207).

In one embodiment, processing logic, when operating in control mode 1, slows down a program that initiates too many memory requests which, in turn, results in long memory latency. In one embodiment, processing logic also controls a program that causes cache-streaming. In one embodiment, memory latency is an indication of memory bandwidth utilization. Long memory latency indicates that the memory system is overloaded with requests from low priority programs.

In one embodiment, processing logic sets a set point of a PI controller (process block 213). In one embodiment, the set point is a memory latency threshold value (e.g., 65 ns).

In one embodiment, processing logic monitors memory latency associated with a core executing a high priority program (process block 214). In one embodiment, processing logic also monitors information, such as, for example, misses per instruction (MPI), cache line fills, cache line evictions, etc. In one embodiment, a high MPI or a large number of cache line evictions indicates that some programs sharing the same memory system are cache streaming programs.

In one embodiment, processing logic compares data from the monitoring with the set point (process block 215). In one embodiment, no action is taken if the memory latency is within a predetermined range. In one embodiment, if the memory latency is higher than the set point, a PI control mechanism generates an output based at least on the difference (error) between the set point and the memory latency (process block 216). In one embodiment, processing logic determines, based on the output, whether to increase a T-state (less enforcement) or to decrease a T-state (more enforcement) of cores associated with low priority programs (process block 217).

In one embodiment, processing logic determines to set all cores associated with low priority programs to operate at 75% duty cycles if the memory latency is higher than a set point (e.g., 65 ns). In one embodiment, processing logic improves overall throughput by decreasing a T-state of a core that executes one or more program resulting a high MPI.

In one embodiment, processing logic, when operating in control mode 2, controls a power consumption of a system (process block 223).

In one embodiment, processing logic sets a set point of a PI controller. In one embodiment, the set point is a system power constraint (e.g., 225 W). In one embodiment, processing logic monitors power consumption associated with the system (process block 224).

In one embodiment, processing logic compares data from the monitoring with the set point (process block 225). In one embodiment, no action is taken if the power consumption is within a predetermined range. In one embodiment, if the power consumption is higher than the set point, a PI control mechanism generates an output based at least on the difference (error) between the set point and the power consumption (process block 226). In one embodiment, processing logic determines, based on the output, whether to increase a T-state (less enforcement) or to decrease a T-state (more enforcement) of cores associated with low priority programs (process block 227).

In one embodiment, if the power consumption remains higher than the set point, processing logic reduces a T-state (more enforcement) of cores executing high priority programs. In one embodiment, processing logic also reduces a P-state of the processor if the power consumption remains higher than the set point.

In one embodiment, processing logic repeats the operation at each sampling interval.

Figure 3:
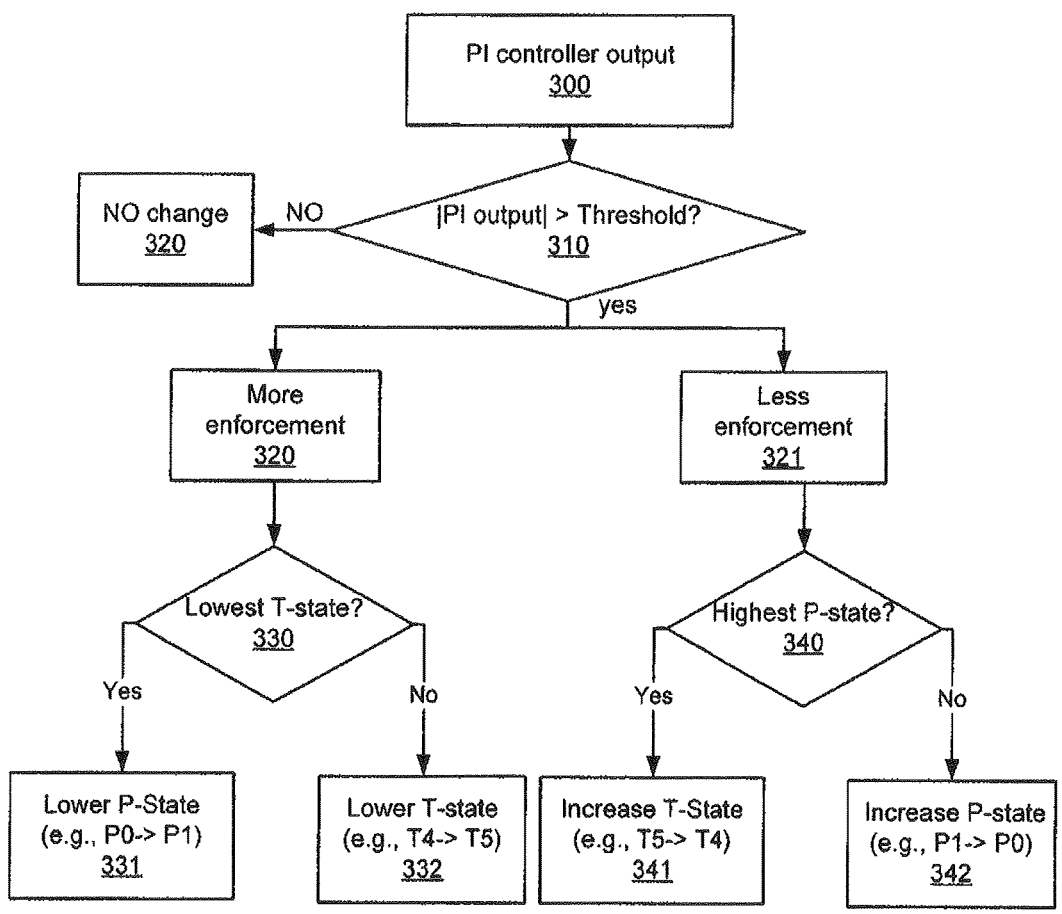
FIG. 3 is a flow diagram of one embodiment of a process to regulate power or clock throttling.

FIG. 3 is a flow diagram of one embodiment of a process to regulate power or clock throttling. The process is performed by processing logic that may comprise hardware (circuitry, dedicated logic, etc.), software (such as is run on a general purpose computer system or a dedicated machine), or a combination of both. In one embodiment, the process is performed in conjunction with a controller (e.g., decision logic 127 with respect to FIG. 1). In one embodiment, the process is performed by a computer system with respect to FIG. 5.

In one embodiment, a PI controller generates a numeric output (process block 300). In one embodiment, processing logic determines whether output from a PI controller is within a range (process block 310). In one embodiment, no action will be taken if output from the PI controller is within a range (process block 320). In one embodiment, the range is set to prevent the enforcement mechanism from constantly toggling between performance states. In one embodiment, the effect on performance slightly lags behind an enforcement operation (a hysteresis effect). In one embodiment, the ranges used in different control modes are shown in the following table.

TABLE 1

Threshold values

| Mode | Low Threshold | Mid Threshold | High Threshold |
|---|---|---|---|
| 0 | −0.5 | N/A | 0.6 (0.5) |
| 1 | N/A | 65ns | N/A |
| 2 | −10 W | N/A | 10 W |

In one embodiment, a positive output value from a PI controller indicates that more enforcement is required, whereas a negative output value from the PI controller indicates that enforcement should be reduced.

In one embodiment, if more enforcement is required (process block 320), processing logic determines whether the current T-state is the lowest T-state (process block 330). If the current T-state is the lowest T-state (e.g., T7), processing logic determines to lower a P-state (e.g., transitioning from P0 to P1) (process block 331). Otherwise, processing logic determines to lower a T-state (e.g., transitioning from T4 to T5) (process block 332).

In one embodiment, if less enforcement is required (process block 321), processing logic determines whether the current P-state is the highest P-state (process block 340). If the current P-state is the highest P-state (e.g., P0), processing logic determines to increase a T-state (e.g., transitioning from T5 to T4) (process block 341). Otherwise, processing logic determines to increase P-state (e.g., transitioning from P1 to P0) (process block 342).

In one embodiment, P-states control is only available at a socket level, such that different processing elements on a same socket receive a same P-state setting.

In one embodiment, operating points are defined as combinations of different P-states and T-states. In one embodiment, for example, P0 and T0 are the current states. T0 through T7 are supported in the example. When more enforcement is required, processing logic selects a combination of P0/T1. Subsequently, at the next operation, processing logic selects a combination of P0/T2 as the operating point if more enforcement is required (based on performance data feedback from monitoring). The process repeats until processing logic selects the combination of P0/T7 (the lowest T-state). If more enforcement is still required, processing logic selects a combination of P1/T7, followed by P2/T7 and so on.

In other embodiments, processing logic begins to lower a P-state when the T-state reaches at T4 (50% clock modulation) instead of T7 for efficiency reasons.

Figure 4:
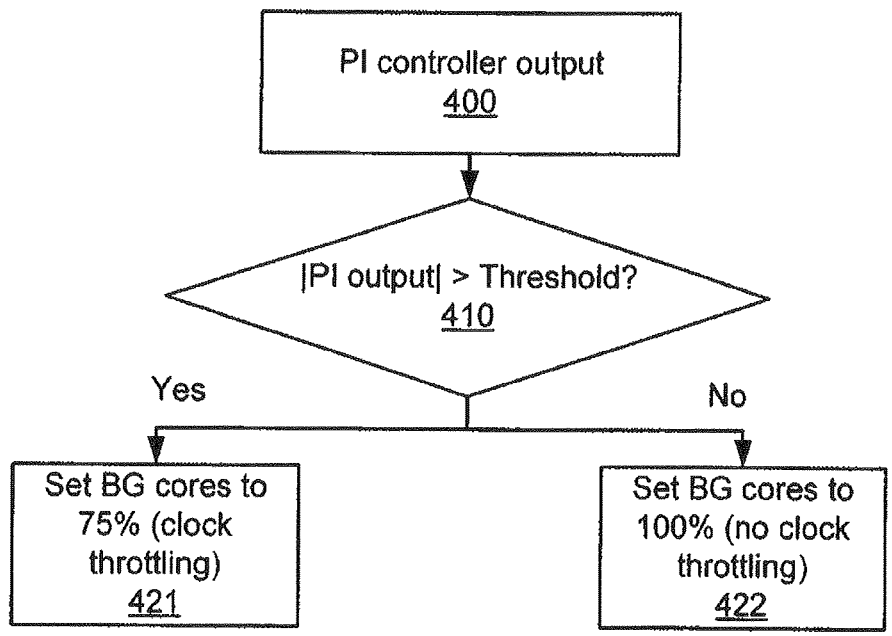
FIG. 4 is a flow diagram of one embodiment of a process to regulate clock throttling based on outputs from a controller.

FIG. 4 is a flow diagram of one embodiment of a process to regulate clock throttling based on outputs from a controller. The process is performed by processing logic that may comprise hardware (circuitry, dedicated logic, etc.), software (such as is run on a general purpose computer system or a dedicated machine), or a combination of both. In one embodiment, the process is performed in conjunction with a controller (e.g., decision logic 127 in FIG. 1). In one embodiment, the process is performed in conjunction with control mode 0 or control mode 1 with respect to FIG. 2.

In one embodiment, the process begin by processing logic determines an output from a PI controller (process block 400). In one embodiment, processing logic determines whether output from a PI controller is within a range (process block 410). In one embodiment, the range is set to a lower bound and an upper bound of memory latency.

In one embodiment, processing logic sets all cores associated with low priority programs (e.g., background applications) to operate at 75% duty cycles if the output from the PI controller is not in the range (process block 421). In one embodiment, processing logic sets cores associated with low priority programs to operate at a lower duty cycles (e.g., 50%) if the output from the PI controller is out of the range.

In one embodiment, processing logic sets all cores associated with low priority programs to operate at 100% duty cycles (at T0) if output from the PI controller is back in the range (process block 422).

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 5:
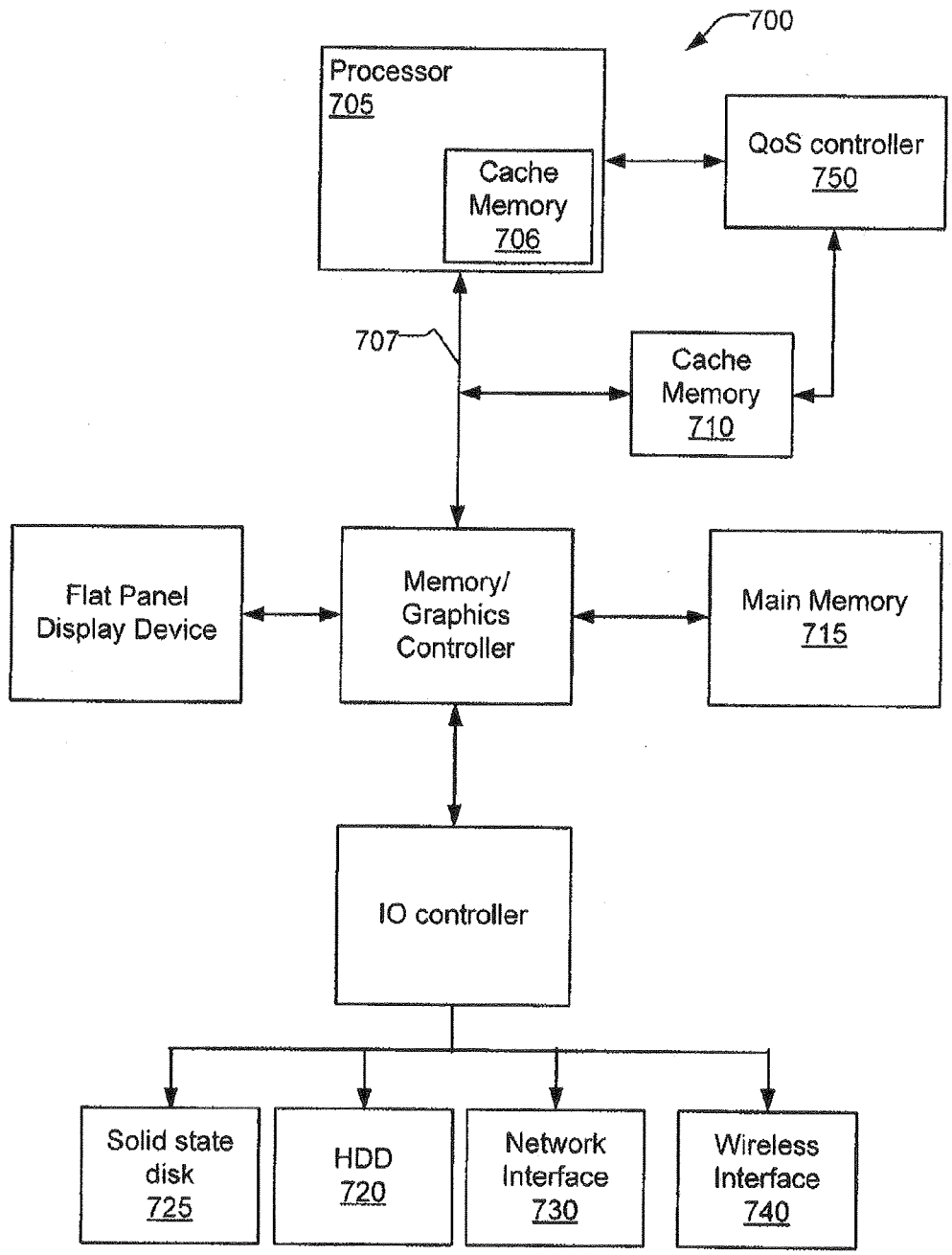
FIG. 5 illustrates a computer system for use with one embodiment of the present invention.

FIG. 5, for example, illustrates a computer system in conjunction with one embodiment of the invention. Processor 705 accesses data from level 1 (L1) cache memory 706, level 2 (L2) cache memory 710, and main memory 715. In other embodiments of the invention, cache memory 706 may be a multi-level cache memory comprise of an L1 cache together with other memory such as an L2 cache within a computer system memory hierarchy and cache memory 710 are the subsequent lower level cache memory such as an L3 cache or more multi-level cache. Furthermore, in other embodiments, the computer system may have cache memory 710 as a shared cache for more than one processor core.

In one embodiment, the computer system includes quality of service (QoS) controller 750. In one embodiment, QoS contoller 750 is coupled to processor 705 and cache memory 710. In one embodiment, QoS controller 750 regulates processing elements of processor 705 to control resource contention to shared resources. In one embodiment, QoS controller 750 includes logic such as, for example, PI controller 120, decision logic 127, operating point control 128, or any combinations thereof with respect to FIG. 1. In one embodiment, QoS controller 750 receives data from monitoring logic (not shown) with respect to performance of cache, power, resources, etc.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 5. Furthermore, in other embodiments of the invention may be distributed throughout several circuits, logic units, or devices illustrated in FIG. 5.

Figure 6:
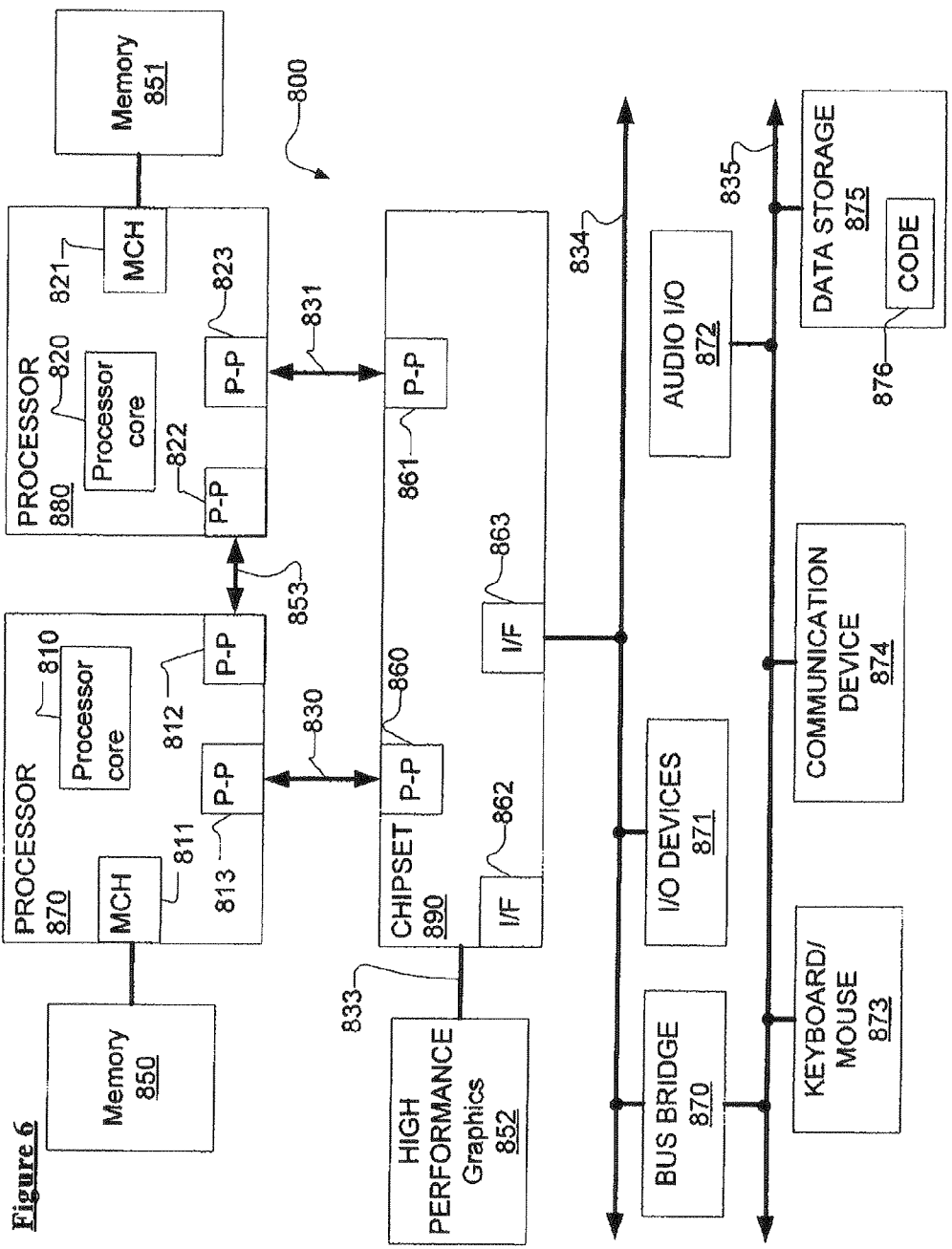
FIG. 6 illustrates a point-to-point computer system for use with one embodiment of the invention.

Similarly, at least one embodiment may be implemented within a point-to-point computer system. FIG. 6, for example, illustrates a computer system that is arranged in a point-to-point (PtP) configuration. In particular, FIG. 6 shows a system where processors, memory, and input/output devices are interconnected by a number of point-to-point interfaces.

The system of FIG. 6 may also include several processors, of which only two, processors 870, 880 are shown for clarity. Processors 870, 880 may each include a local memory controller hub (MCH) 811, 821 to connect with memory 850, 851. Processors 870, 880 may exchange data via a point-to-point (PtP) interface 853 using PtP interface circuits 812, 822. Processors 870, 880 may each exchange data with a chipset 890 via individual PtP interfaces 830, 831 using point to point interface circuits 813, 823, 860, 861. Chipset 890 may also exchange data with a high-performance graphics circuit 852 via a high-performance graphics interface 862. Embodiments of the invention may be coupled to computer bus (834 or 835), or within chipset 890, or coupled to data storage 875, or coupled to memory 850 of FIG. 6.

Other embodiments of the invention, however, may exist in other circuits, logic units, or devices within the system of FIG. 6. Furthermore, in other embodiments of the invention may be distributed throughout several circuits, logic units, or devices illustrated in FIG. 6.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A processor comprising:
    a plurality of cores to execute threads, wherein a limit is to be set to specify a number of cycles per instruction that a first core is permitted to execute;
    throttling logic configured to throttle the first core to prevent the first core from exceeding the set limit in a first control mode; and
    power management logic configured to monitor power usage of the processor and to store a power usage constraint associated with the processor, wherein the throttling logic is configured to throttle one or more of the cores to prevent the power usage constraint from being exceeded responsive to detection that the power usage constraint of the processor is to be exceeded in a second control mode.

2. The processor of claim 1, further comprising:
    frequency adjustment logic to adjust a frequency of one or more of the plurality of cores to reduce power usage of the cores in response to the detection that the power usage constraint of the processor is to be exceeded.

3. The processor of claim 1, wherein the cores include hardware thread slots.

4. The processor of claim 1, wherein the processor comprises a proportional integral controller to receive the power usage constraint and feedback data and to output a control signal.

5. The processor of claim 4, wherein the processor further comprises a decision logic to receive the control signal and to output a decision to the throttling logic.

6. The processor of claim 5, further comprising monitor logic to receive monitoring data and to provide the feedback data to the proportional integral controller.

7. The processor of claim 6, wherein the proportional integral controller, the monitor logic and the decision logic are to operate independently of an operating system (OS).

8. The processor of claim 1, further comprising a cache to be shared by at least some of the plurality of cores.

9. A system comprising:
    a processor including:
        a plurality of cores to execute threads, wherein a limit is to be set to specify a number of cycles per instruction that a first core is permitted to execute;
        throttling logic configured to throttle the first core to prevent the first core from overshooting the set limit in a first control mode; and
        power management logic configured to store a power usage constraint associated with the processor and to monitor power usage of the processor, wherein responsive to detection that the power usage constraint of the processor is to be exceeded, the throttling logic is configured to throttle one or more of the cores to prevent the power usage constraint from being exceeded in a second control mode; and a dynamic random access memory (DRAM) coupled to the processor.

10. The system of claim 9, further comprising:
frequency adjustment logic to adjust a frequency of one or more cores to reduce power usage of the cores in response to the detection that the power usage constraint of the processor is to be exceeded.

11. The system of claim 9, wherein the processor comprises a proportional integral controller to receive the power usage constraint and feedback data and to output a control signal.

12. The system of claim 11, wherein the processor further comprises a decision logic to receive the control signal and to output a decision to the throttling logic.

13. The system of claim 12, further comprising monitor logic to receive monitoring data and to provide the feedback data to the proportional integral controller.

14. The system of claim 13, wherein the proportional integral controller, the monitor logic and the decision logic are to operate independently of an operating system (OS).

15. A non-transitory machine-readable medium having stored thereon instructions, which if performed by a machine cause the machine to perform a method comprising:
specifying a limit of a rate of instruction execution which a first core of a plurality of cores of a processor is permitted to execute over an amount of time;
throttling the first core to prevent the first core from overshooting the limit based on comparison of the limit with monitoring data when in a first control mode;
programming a power usage constraint associated with the processor;
monitoring power usage of the processor; and
responsive to detecting that the power usage constraint of the processor is to be exceeded, throttling one or more of the cores to prevent a power threshold from being exceeded when in a second control mode.

16. The non-transitory machine-readable medium of claim 15, wherein the method further comprises:
adjusting a frequency of one or more cores to reduce power usage of the cores in response to detecting that the power usage constraint of the processor is to be exceeded.

17. The non-transitory machine-readable medium of claim 15, wherein the method further comprises sharing at least some processor resources of the processor between the plurality of cores.

18. The non-transitory machine-readable medium of claim 15, wherein the method further comprises receiving the power usage constraint and feedback data in a proportional integral controller and outputting a control signal.

19. The non-transitory machine-readable medium of claim 18, wherein the method further comprises receiving the control signal in a decision logic and outputting a decision to a throttling logic.

20. The non-transitory machine-readable medium of claim 19, wherein the method further comprises receiving the monitoring data in a monitor logic and providing the feedback data to the proportional integral controller.

\* \* \* \* \*